(12) United States Patent
Rodriguez et al.

(10) Patent No.: US 8,190,496 B2
(45) Date of Patent: May 29, 2012

(54) METHOD AND SYSTEM OF DIRECTED ADVERTISING

(75) Inventors: Augustin Rodriguez, Long Island City, NY (US); Philippe Desandre, San Francisco, CA (US)

(73) Assignee: Embedded Brand, Inc., Cheyenne, WY (US)

( * ) Notice: Subject to any disclaimer, the term of this patent is extended or adjusted under 35 U.S.C. 154(b) by 974 days.

(21) Appl. No.: 12/098,755

(22) Filed: Apr. 7, 2008

(65) Prior Publication Data

US 2009/0254426 A1    Oct. 8, 2009

(51) Int. Cl.
*G06Q 30/00* (2012.01)
(52) U.S. Cl. .................. 705/26.81; 705/14.4
(58) Field of Classification Search ........... 705/26.81, 705/14.4
See application file for complete search history.

(56) References Cited

U.S. PATENT DOCUMENTS

| | | | |
|---|---|---|---|
| 5,860,068 A | 1/1999 | Cook | |
| 6,178,411 B1 * | 1/2001 | Reiter | 705/408 |
| 6,496,744 B1 | 12/2002 | Cook | |
| 7,277,866 B1 * | 10/2007 | Or-Bach et al. | 705/28 |
| 7,430,517 B1 * | 9/2008 | Barton | 705/7.24 |
| 2002/0016726 A1 | 2/2002 | Ross | |
| 2002/0030854 A1 | 3/2002 | Schutz et al. | |
| 2002/0123926 A1 | 9/2002 | Bushold et al. | |
| 2004/0054578 A1 | 3/2004 | Edgington, Jr. | |
| 2004/0064351 A1 | 4/2004 | Mikurak | |
| 2004/0073485 A1 | 4/2004 | Liu et al. | |
| 2005/0038758 A1 | 2/2005 | Hilbush et al. | |
| 2006/0253385 A1 | 11/2006 | Reams | |
| 2007/0106555 A1 | 5/2007 | Benson | |
| 2008/0270220 A1 * | 10/2008 | Ramer et al. | 705/10 |

* cited by examiner

*Primary Examiner* — Jagdish Patel
*Assistant Examiner* — Sara C Hamilton
(74) *Attorney, Agent, or Firm* — Raubvogel Law Office

(57) ABSTRACT

A method is provided for directed advertising on a shipment tracking status webpage. Advertisements are received and categorized based on preselected criteria. Shipping orders are received and tracking numbers associated with the shipping orders are provided. Tracking status information is received for the shipping orders. A tracking status request for a shipping order is received based on a tracking number. The tracking status information for the shipping order associated with the tracking number is accessed. The tracking information for the shipping order and at least one advertisement, which is selected based on the preselected criteria, is provided for display on the shipment tracking status webpage.

34 Claims, 7 Drawing Sheets

METHOD AND SYSTEM OF DIRECTED ADVERTISING

FIELD OF THE INVENTION

The present invention relates to a method and system of directed advertising, and more particularly, to a method and system of directed advertising on a shipment tracking status webpage.

BACKGROUND OF THE INVENTION

The Internet commerce industry has developed rapidly in recent years. Rather than having to physically go to a store to purchase a product and transport it home, customers are able to purchase a product from a merchant's website and have it delivered to them by a shipping carrier, such as United Parcel Service (UPS®), Federal Express (FedEx®), DHL®, and the United States Postal Service (USPS®).

To make the shipping process more accommodating, merchants offer websites that can be used to place shipping orders and provide information including the shipping carrier identification and a tracking number. Customers can make shipment status inquiries by directly or indirectly accessing the particular shipping carrier's website and entering the tracking number associated with their shipping order. Merchants may also provide an embedded hyperlink to the customer which provides access to the tracking status webpage of the shipping carrier's website. The accessed webpage will then display the tracking status and some of the shipping details for the shipping order.

Customers make millions of tracking status requests everyday. Presently, there is no targeted advertising available on tracking status webpages that is offered to shippers and/or third party advertisers and that is directed to the customers who utilize such shipment tracking status webpages. Thus, there is a substantial avenue for brand promotion and advertising that is currently going untapped.

Existing methods of providing advertisements over the Internet do not provide an effective method for targeting the relevant interests of the consumers that directly or indirectly access shipping carrier websites to make tracking status requests.

Internet advertisements can be delivered by a search engine, such as Google®, Yahoo®, and MSN®, based on an active search query made by a user. Search engines deliver information and advertising content to a user by matching advertisements directly to keywords entered by the user. The search engine accesses its advertisement database and selects at least one or more advertisements associated with the selected keywords. The search engine then returns a webpage containing references to the documents matching the keywords and the one or more advertisements selected from its advertisement database. This method of Internet advertising is presently of no usefulness in generating revenues for shipping carriers from merchants and/or third party advertisers. This is because when a tracking number (i.e., a quasi-random string of characters and numerals) is used as a search term instead of a complete word, the tracking number does not itself provide any relevant advertisement selection criteria from which a directed advertisement can be chosen. Presently, no advertisements are displayed when a tracking number is used as a search term in a search engine.

Certain websites provide shopping carts in which a user can store items that they are considering for purchase. For example, see U.S. Patent Publication No. 2004/0064351 to Mikurak. The information gathered from the shopping carts is utilized to access an advertising database to deliver one or more advertisements or webpages that offer similar products to what the user has stored in the shopping carts. However, shipping carriers typically offer only shipping products and services on their websites, and thus the information gleaned from shopping carts will not be effective in targeting advertisements of merchants and/or third party advertisers to the interests of the customer. Further, the shipping carrier typically has no access or limited access to the process by which the specific product shipped was chosen.

Other websites require a user to create a client account to view content or make transactions, and deliver Internet advertisements based on information stored in the account. For example, see U.S. Patent Publication No. 2007/0106555 to Benson and U.S. Pat. No. 5,860,068 to Cook. When users create a client account, a unique customer identification number is assigned to each user, and the user is requested to enter personal information such as name, products of interest, hobbies, salary, gender, address, city, state, and zip code. This information is stored in a database along with the history of transactions made by the user. When the users log in to their account, the website accesses its advertisement database and selects an advertisement based on the users' personal and transaction history information stored in the database. However, with a shipping carrier's website, the client account is typically the merchant shipper, rather than the end customer. Thus, the personal and transaction history information stored in the client account will generally not provide the most relevant information to use for targeting advertisements to the interests end customer.

SUMMARY OF THE INVENTION

According to one embodiment, the present invention is directed to a method for providing directed advertising on a shipment tracking status webpage. Advertisements are received and categorized based on preselected criteria. Shipping orders are received and tracking numbers associated with the shipping orders are provided. Tracking status information is received for the shipping orders. A tracking status request for a shipping order is received based on a tracking number. The tracking information for the shipping order associated with the tracking number is accessed. The tracking information for the shipping order and at least one advertisement, which is selected based on the preselected criteria, is provided for display on the shipment tracking status webpage.

According to one embodiment, a system for providing directed advertising on a shipment tracking status webpage includes a shipment tracking system and an advertisement system. The shipment tracking system receives shipping orders, generates tracking numbers associated with the shipping orders, receives tracking information for the shipping orders, and communicates the tracking information for the shipping orders based on the tracking number. The advertisement system receives advertisements, categorizes the received advertisements based on preselected criteria, and selects an advertisement based on the preselected criteria. In response to a tracking status request based on a tracking number, the tracking information for a shipping order and at least one advertisement selected from the advertising system is provided for display on the shipment tracking webpage.

These and other features of this invention are described in, or are apparent from, the following detailed description of various example embodiments of this invention.

BRIEF DESCRIPTION OF THE DRAWINGS

Exemplary embodiments of this invention will be described with reference to the accompanying figures.

DETAILED DESCRIPTION OF THE
EXEMPLARY EMBODIMENTS

Figure 1:
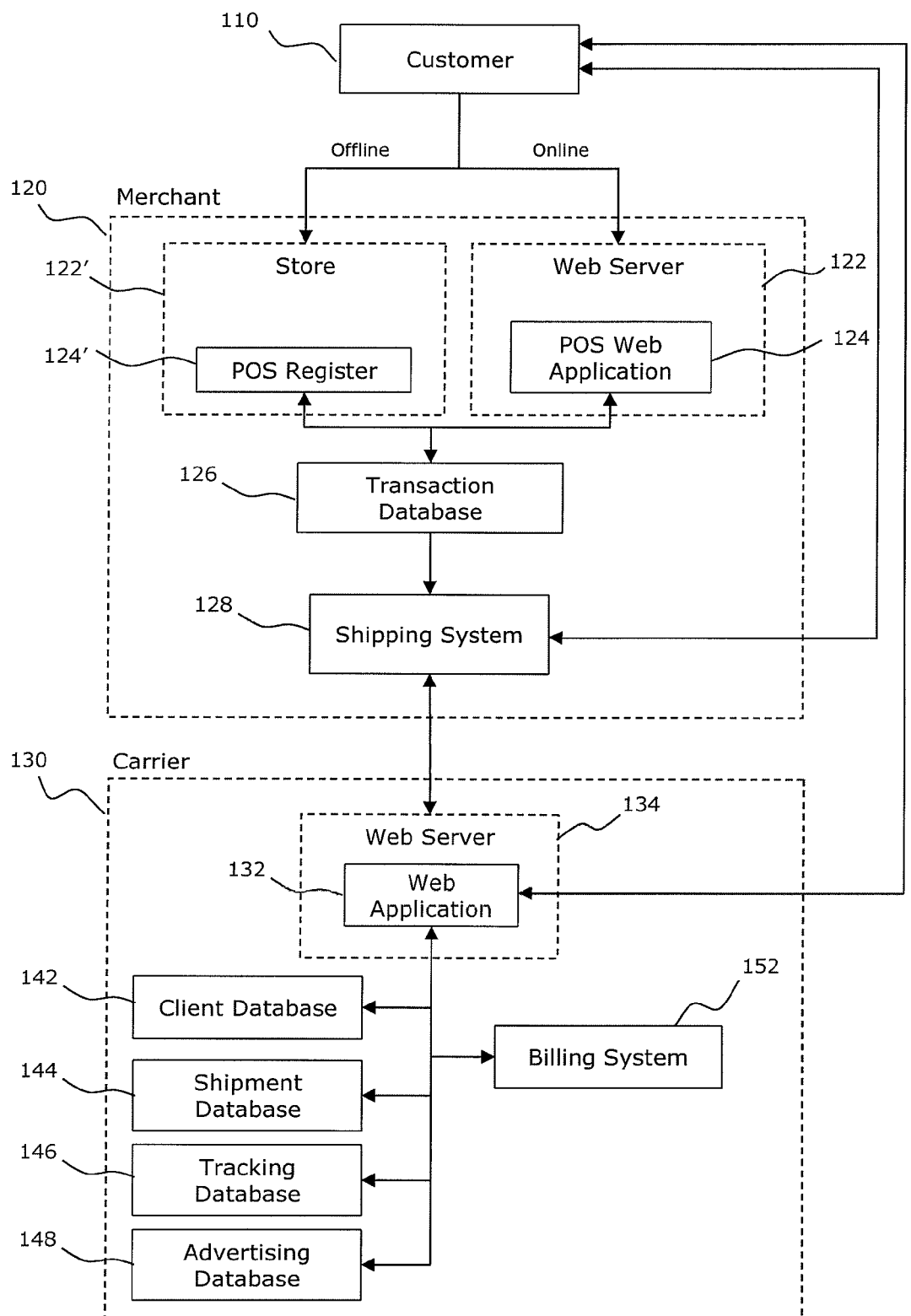
FIG. 1 is a block diagram illustrating a system for shipping a package and providing directed advertising on the shipping carrier's order tracking status webpage according to the present invention.

FIG. 1 is a block diagram illustrating a system for shipping a package and providing directed advertising on the shipping carrier's order tracking status webpage according to the present invention.

Referring to FIG. 1, a merchant 120 operates a retail business in which purchased products are shipped to customers 110 through the use of a shipping carrier 130 (e.g., UPS®, FedEx®, DHL®, and the USPS®).

The merchant 120 receives purchase orders from customers 110 at a point-of-sale (POS) 124, 124'. For example, the merchant 120 can receive purchase orders over the Internet and/or from electronic commerce website 124, which is generated by a web server 122. The web server 122 can be operated by the merchant 120 or a third party. The merchant 120 can also conduct business in person at a retail store 122', in which case transactions are conducted at a cash register 124'. Further, business can be conducted in a variety of other methods, such as over the telephone, in person at trade shows, etc., in which case the transactions are subsequently recorded at a POS terminal 124, 124'.

The POS 124, 124' generates records for the purchase transactions which are stored in a transaction database 126. The transaction database 126 can be stored on a server that is operated by the merchant 120 or by a third party. The records include shipping and transaction information for each of the purchase transactions.

The shipping information includes the details of the shipment, such as the shipper's name (e.g., merchant 120), the shipping date, the shipping/pickup address, the recipient's name (e.g., customer 110), the delivery address, the weight of the box, the size of the box, the number of boxes, the shipping preferences, etc.

The transaction information includes the details of the transaction, such as the payor's name (e.g., merchant 120, customer 110, or a third party), the payor's billing address, the product purchased, the quantity purchased, the product's SKU or UPC number, the type or category of the product, the price, the method of payment, etc.

A shipment processing system 128 is used by the merchant 120 to generate shipping requests for purchase transactions that require shipment to the customer. Each shipping request includes the shipping information for a corresponding purchase transaction stored in the transaction database 126, and may also include one or more details of the transaction information. The shipment processing system 128 is typically a software application that automatically generates a shipping request. However, a shipping request can be generated manually at the request of the merchant 120.

A shipping carrier 130 operates a shipping website 132. The website 132 is generated by a web server 134, which is connected to a client database 142, a shipment database 144, a tracking database 146, and an advertising database 148. The web server 134 routes data pertaining to client accounts, shipping orders, tracking information, and advertisements to the client, shipment, tracking, and advertisement databases 142, 144, 146, 148, respectively, and retrieves data as required. The databases 142, 144, 146, 148 may be stored on one server or on separate linked servers, and the server or servers may be maintained by the shipping carrier or by a third party. For example, the client, shipment, and tracking databases 142, 144, 146 may be maintained by the shipping carrier 130, while the advertisement database 148 is maintained by a third party (e.g., an advertising system of a search engine).

The web server 134 is configured to receive a shipping request for a shipment of a package from a shipper (e.g., merchant 120) to a recipient (e.g., customer 110). The website 132 can be configured to receive a shipping request directly from a shipment processing system 128 and can also allow manual entry of a shipping request into the web server 134.

The client database 142 stores records of client accounts. The client is typically the shipper (e.g., merchant 120), but can also be the recipient (e.g., customer 110) or a third party. The client account records can include the client's name, type of business, the industry Standard Industrial Classification (SIC) code, contact person, mailing address (e.g., street address, city, state, zip code, country), billing address, phone number, email address, payment information (e.g., a valid credit card, bank account, or other payment arrangement), shipping preferences, etc. If the client account is for the customer 110, the client database 142 can also include shipment history for such customer.

The shipment database 144 stores records of shipping orders. The shipping records can include shipping information and may also include one or more details of the transaction information for each of the shipping orders.

The shipping information includes the details of the shipment, such as the shipper's name (e.g., merchant 120), the shipping date, the shipping/pickup address, the recipient's name (e.g., customer 110), the delivery address, the weight of the box, the size of the box, the number of boxes, the shipping preferences, etc.

The transaction information includes the details of the transaction, such as the payor's name (e.g., merchant 120, customer 110, or a third party), the payor's billing address, the product purchased, the quantity purchased, the product's SKU or UPC number, the type or category of the product, the price, the method of payment, etc.

The tracking database 146 stores records of tracking information for the shipping orders. The tracking records include the status and location of the shipments from pickup through delivery.

The advertising database 148 stores advertisements. The advertisements may include text, graphics, pictures, animations, audio messages, videos, hyperlinks, and the like. The advertisement may be in the form of an impression, a banner advertisement, a pop-up or pop-under advertisement, a flash advertisement, and the like.

The advertising database 148 also stores advertisement selection criteria, which allows an advertiser to select which shipping orders their advertisements will be associated with. For example, the advertisements selection criteria can be configured so that the advertisements are associated with at least one aspect of the shipping information, and can also be associated with one or more details of the transaction and/or client information.

The web server 134 is connected to a billing system 152 that processes payment instructions and collects payment from clients by charging a client account, a valid bank account, a valid credit card, etc.

The website 132 allows the customer 110 to make a tracking status request for a shipment. The results of the tracking status request for the shipment are displayed on a tracking status webpage, which includes the tracking information and one or more details of the shipping information for the shipment, and may also include one or more details of the transaction and/or client information. Along with the results of the tracking status request, one or more directed advertisements are displayed on the tracking status webpage.

Figure 2:
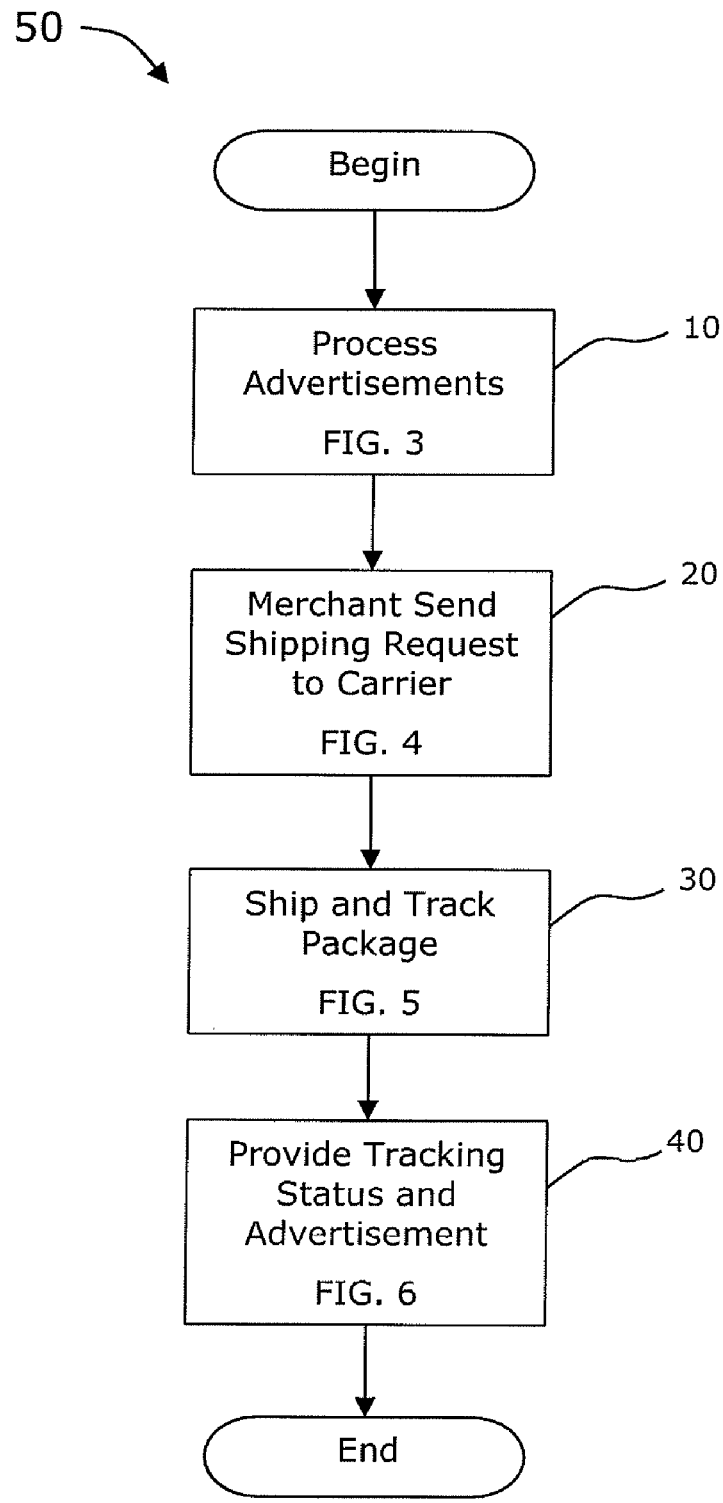
FIG. 2 is a flow chart illustrating a method for shipping a package and providing directed advertising on the shipping carrier's order tracking status webpage according to the present invention.

FIG. 2 is a flow chart illustrating a method 50 for shipping a package and providing directed advertising on the shipping carrier's order tracking status webpage according to the present invention. The method of FIG. 2 incorporates the methods illustrated in FIGS. 3-6.

Figure 3:
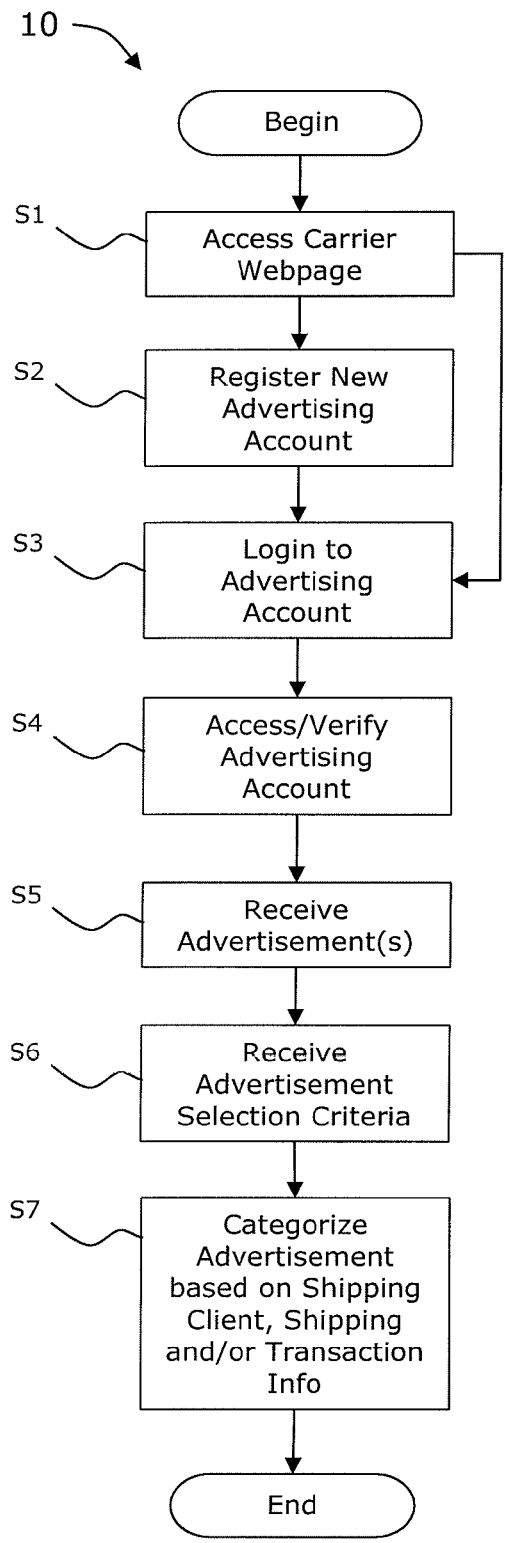
FIG. 3 is a flow chart illustrating a method of managing an advertising account on a shipping carrier's website.

FIG. 3 is a flow chart illustrating a method 10 of managing an advertising account on a shipping carrier's website.

Referring to FIG. 3, an advertiser accesses a shipping carrier's website 132 to manage their advertising account (step S1). For example, the advertiser can be a shipper (e.g., merchant 120) or a third party advertiser.

In step S2, if the advertiser is not a preexisting advertiser, the advertiser registers for an advertising account. The records for the advertising account are stored in the advertising database 148. The advertising account can be linked to a client account or can be a separate account. The website 132 can be configured to allow an advertiser to access their advertising account through their client account or to login directly to their separate advertising account.

In step S3, the advertiser logs in to their advertising account. In step S4, the shipping carrier's web server 134 accesses and verifies the advertising account records from the advertisement database 148.

In step S5, the advertiser uploads one or more advertisements to be stored in the advertisement database 148. The advertisements may include text, graphics, pictures, animations, audio messages, videos, hyperlinks, and the like. The advertisement may be in the form of an impression, a banner advertisement, a pop-up or pop-under advertisement, a flash advertisement, and the like.

For example, an advertisement can be an impression including the advertiser's business name and/or logo, and/or a banner advertisement including promotional information. The advertisement may contain a hypertext link which directs the user to the advertiser's webpage or to any other form of media chosen by the advertiser when the user clicks on the advertisement.

The placement of an advertisement including the name and/or logo of an advertiser may increase the exposure of the shipper's brand to existing customers, while the placement of an advertisement including promotional material may alert customers to other promotional offers offered by that advertiser.

In step S6, the advertiser sets advertisement selection criteria. The advertisement selection criteria allows an advertiser to select which shipping orders their advertisements will be associated with, and can be used particularly efficiently to target the advertisements to the customers.

The advertisement selection criteria can include at least one aspect of the shipping information, and may also include one or more details of the transaction and/or client information. For example, the advertisement may be selected based upon the delivery address (e.g., city, state, zip code, country), and may also include the type and category of products purchased, the product's SKU or UPC number, the industry SIC code, etc.

The advertisement selection criteria can be configured so that the shipper's advertisements and/or a third party's advertisements are displayed when a customer views a shipment tracking status webpage. The shipping carrier may also choose to limit the third party advertisements that can be selected for display with a shipping order to guard against conflicts of interest or brand image issues that may cause a shipper to lose business. For example, a third party advertisement may not be selected for display if it includes advertisement selection criteria directly conflicting with the shipping or transaction information for a particular shipping order, such as the shipper's type of business, the type of product being shipped, the category of the product being shipped, etc. Thus, the advertisements can be limited to those of the shipper who placed the shipping order or to third parties who do not compete directly with the shipper who placed the shipping order.

In one exemplary embodiment, the advertisement selection criteria can be configured such that the advertisement selected for display with a shipping order is always an advertisement of the shipper who placed the shipping order (e.g., merchant 120). This can be accomplished by linking a merchant's advertisements directly to the merchant's shipping orders. This can also be accomplished by selecting advertisements based on at least one aspect of the shipping information that is unique to that shipper, for example, the shipper's business name. The selection of advertisements may also include one or more details of the transaction and/or client information.

In another exemplary embodiment, the advertisement selection criteria can be configured so an advertisement selected for display with a shipping order is a third party advertisement. The advertisement can be selected based on any of one or more details of the shipping information. The advertisement may also be selected based on one or more details of the transaction and/or client information. For example, the advertiser can set the advertisement selection criteria so that an advertisement is selected to be displayed with shipping orders in which the shipper is involved in a particular non-conflicting type of business or for shipping orders in which the recipient has a delivery address in a particular zip code, thereby directing the advertisement to a specific non-conflicting type of business or specific geographic area, respectively.

The advertiser can also set limits on when the advertisement is to be selected for display. For example, the advertiser can select the time frame for which the advertisement is to be displayed, which may include a range of dates, days of the week, and/or times. For example, the advertisement could be run from January 1 through February 15, only on Mondays through Fridays, from 6:00 pm to 11:00 pm. The advertiser can also select a limit on how many times an advertisement is to be selected in a designated time period.

The shipping carrier can allow the advertiser to agree to a price (e.g., cost per click, flat rate, bid, etc.) that will be charged each time an advertisement is displayed, which will be charged to the advertiser by the billing system 152. However, the shipping carrier can also allow for the display of advertisements free of charge, for example, as an additional incentive to a shipper to use their services.

Figure 4:
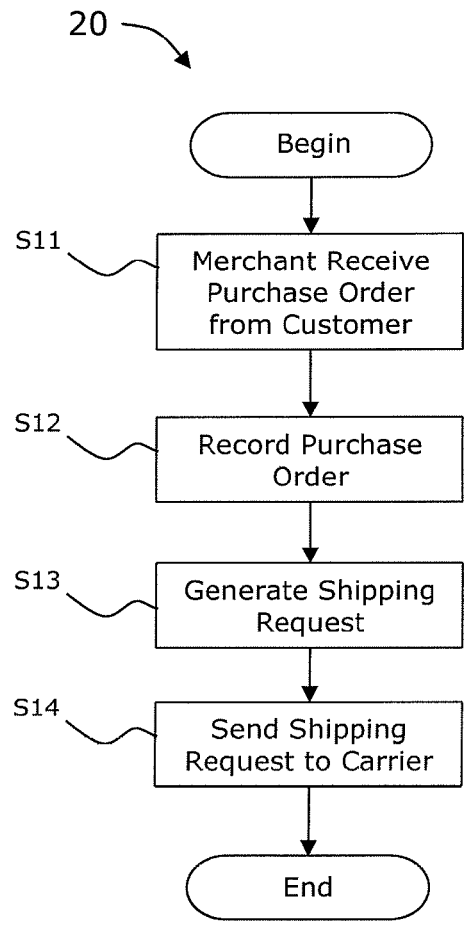
FIG. 4 is a flow chart illustrating a method for placing an online shipping request with a shipping carrier.

FIG. 4 is a flow chart illustrating a method 20 for placing an online shipping request with a shipping carrier.

Referring to FIG. 4, a merchant 120 receives a purchase order from a customer 110 (step S11). The purchase order is typically a transaction conducted online over the Internet, however the purchase order may be a transaction conducted in person at the merchant's retail store 122'. The purchase order is recorded by the merchant's POS system 124, 124' and a record of the purchase transaction stored in a transaction database 126 (step S12).

In step S13, the merchant 120 creates a shipping request for the purchase transaction. The shipping request includes the shipping information for a purchase transaction stored in the transaction database 126, and may also include one or more details of the transaction information. In step S14, the shipping request is sent to a shipping carrier 130.

The shipping request can be generated by the merchant's shipment processing system 128 and communicated over the Internet directly to the shipping carrier's web server 134. Alternatively, the merchant 120 can manually enter the shipping request through the shipping carrier's website 132.

Figure 5:
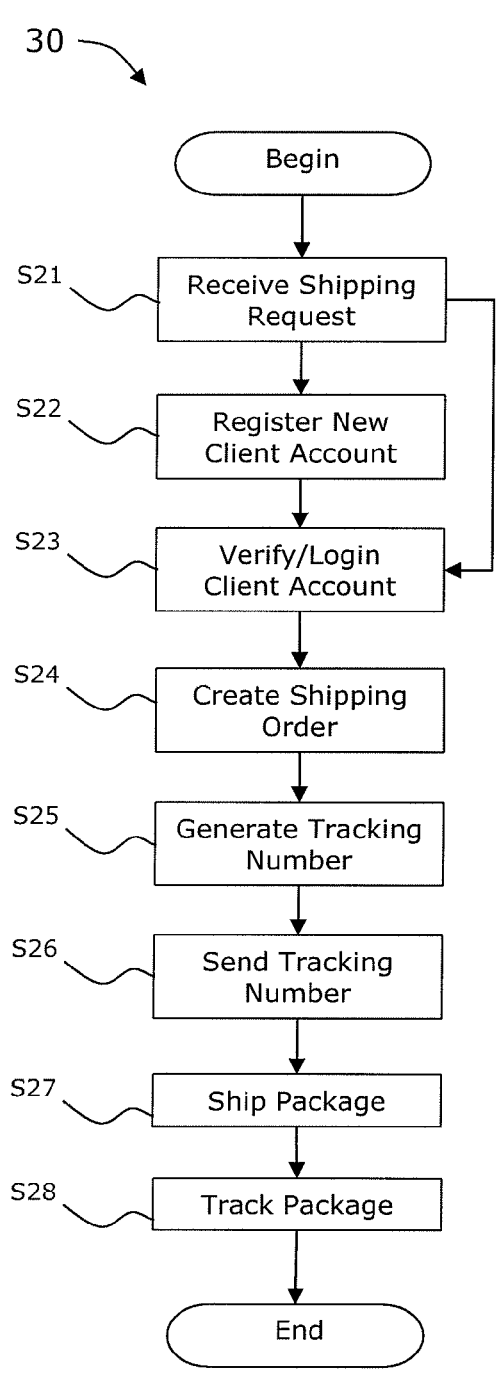
FIG. 5 is a flow chart illustrating a method for shipping and tracking a package online.

FIG. 5 is a flow chart illustrating a method 30 for shipping and tracking a package online.

Referring to FIG. 5, the web server 134 receives the shipping request (step S21) from the merchant 120.

In step S22, the web server 134 verifies whether the merchant 120 who submitted the shipping request has a client account stored in a client database 142. If the merchant 120 does not have a preexisting client account with the shipping carrier 130, a new client account can be created before processing of the shipping request (step S23). If the merchant 120 has a verified client account, a shipping order is created from the shipping request (step S24) which is assigned a unique tracking number (step S25). A record including the details of the shipping order is stored in a shipment database 144, which is identifiable by the tracking number.

In step S26, the shipping carrier 130 issues the tracking number for the shipping order to the merchant 120, who in turn sends the tracking number to the customer 110. The shipping carrier 130 issues the tracking number to the merchant 120 through the shipment processing system 128. Alternatively, the merchant 120 can obtain the tracking number when manually requested through the shipping carrier's website 132.

The merchant 120 typically sends the tracking number to the customer 110 by email, which may include text indicating the tracking number and/or an embedded hyperlink that directly accesses the tracking status webpage of the shipping carrier's website 132.

In step S27, the shipping carrier 130 receives or picks up the package from the merchant 120 to transport it to the customer 110. In step S28, the status and location of the package is tracked by the shipping carrier 130 from pickup through delivery, and the tracking information is uploaded and stored in a tracking database 146.

Figure 6:
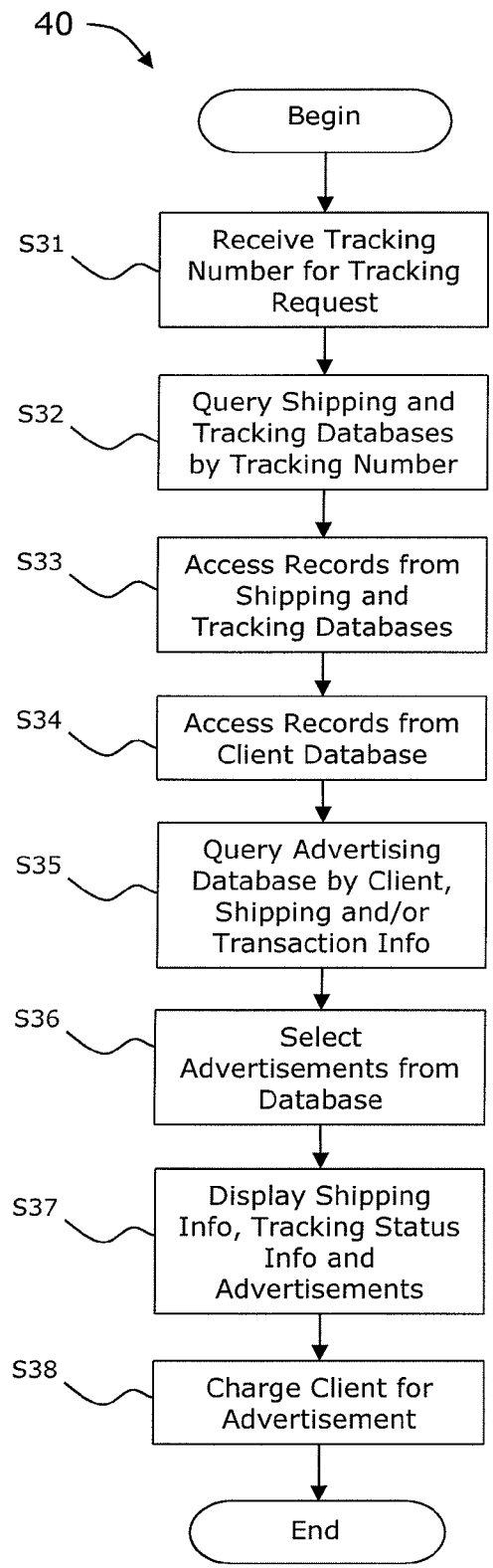
FIG. 6 is a flow chart illustrating a method for providing directed advertising on a shipping carrier's order tracking status webpage according to the present invention.

FIG. 6 is a flow chart illustrating a method 40 for providing directed advertising on a shipping carrier's order tracking status webpage.

Referring to FIG. 6, a customer 110 submits a tracking request to view the status and location of his/her shipment on the shipping carrier's website 132, which is received by the web server 134 (step S31). The tracking request can be submitted by entry of the tracking number for a shipping order into the shipping carrier's website 132, by selecting the hyperlink embedded in the email provided by the merchant 120, or by an active search query made through search engines such as Google®, Yahoo®, and MSN®.

In step S32, the web server 134 queries the shipment database 144 and the tracking database 146 based on the tracking number. The web server 134 accesses the records for the shipping order and tracking information associated with the tracking number (step S33). The web server 134 also can access client records from the client database 142 based on the tracking number or based on information obtained from the shipping order (step S34).

In step S35, the advertisement database 148 is queried based on at least one aspect of the shipping information for the shipping order obtained from the shipment database 144. Such query may also be based on one or more details of the client and/or transaction information obtained from the client and transaction databases 142 and 126, respectively.

One or more advertisements are selected from the advertisement database (step S36). For example, the advertisements may be selected based upon the delivery address (e.g., city, state, zip code, country), and may also be based on one or more details of the transaction and/or client information.

In step S37, the web server 134 directs the website 132 to display selected portions of the shipment and/or tracking information for the shipping order along with the one or more selected advertisements.

The advertisements may include text, graphics, pictures, animations, audio messages, videos, hyperlinks, and the like. The advertisements may be in the form of an impression, a banner advertisement, a pop-up or pop-under advertisement, a flash advertisement, and the like.

In optional step S38, the web server 134 connects to the billing system 152 to bill the advertiser for the advertisement. The advertisement may be charged to the advertiser's advertisement account, bank account, valid credit card, etc. The advertiser may be charged when their advertisements are selected for display or when customers click on the advertisement.

Figure 7:
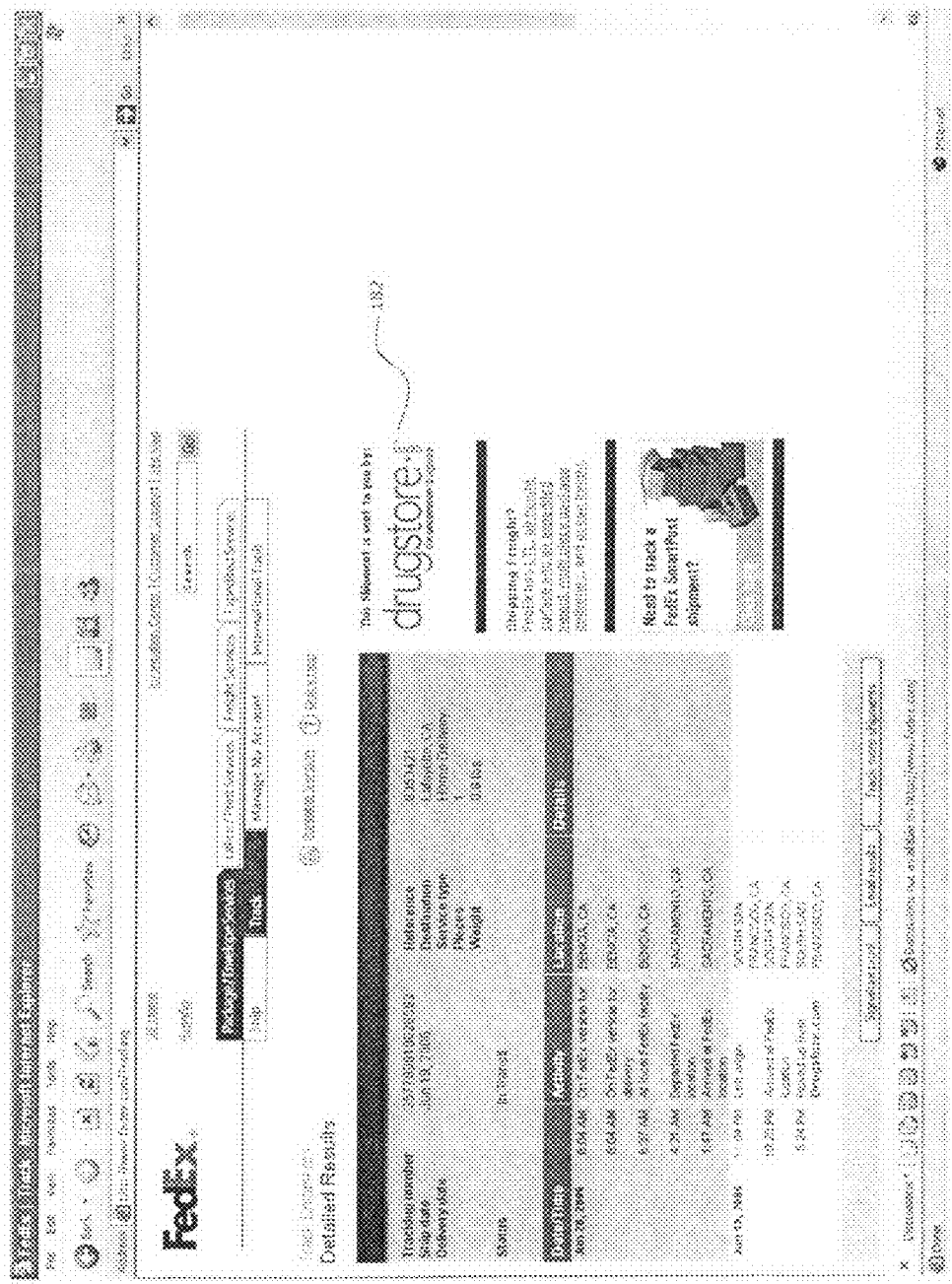
FIGS. 7-9 are examples of a shipping carrier's order tracking webpage displaying directed advertisements according to the present invention.
Figure 8:
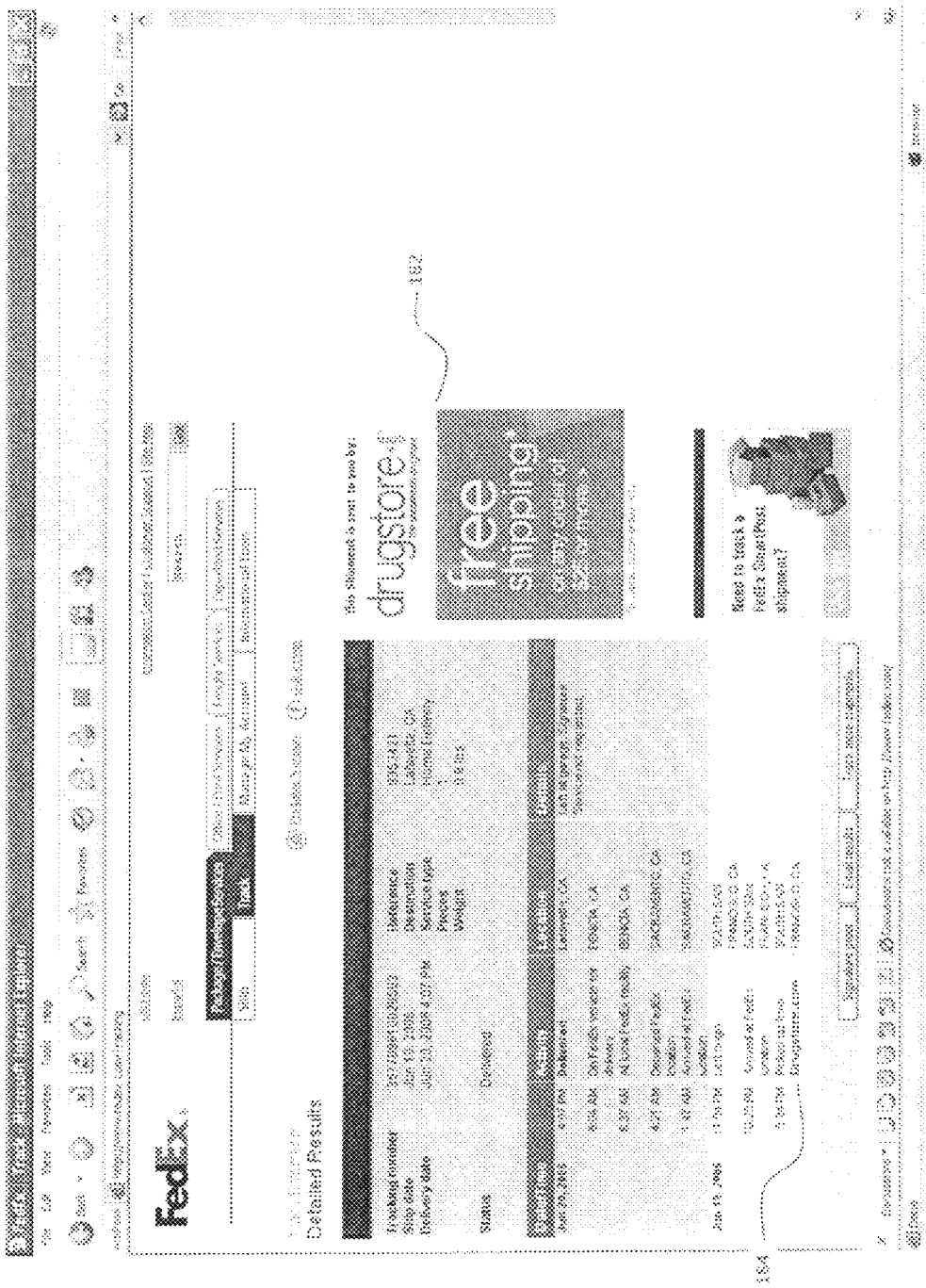
Figure 9:
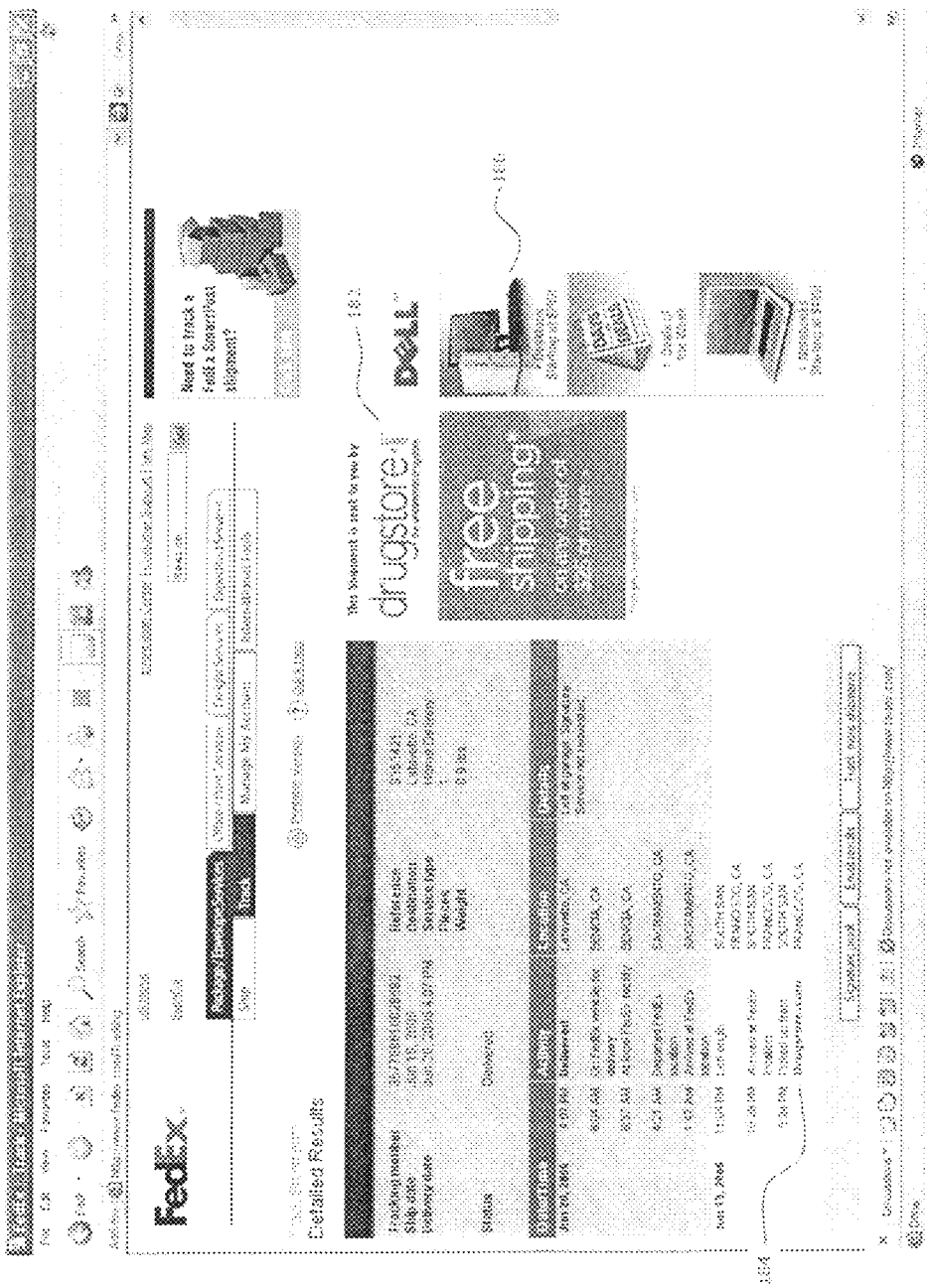

FIGS. 7-9 are examples of a shipping carrier's order tracking status webpage displaying one or more directed advertisements according to the present invention.

Referring to FIG. 7, an advertisement 182 is displayed on a shipping carrier's order tracking status webpage. Advertisement 182 is an impression including the advertiser's (e.g., shipper/merchant 120) business logo.

Referring to FIG. 8, the advertisement 182 displayed on a shipping carrier's order tracking status webpage is an impression including both the advertiser's (e.g., shipper/merchant 120) business logo and a banner advertisement including promotional information for the advertiser.

A second advertisement 184 is also displayed on the shipping carrier's order tracking status webpage. Advertisement 184 is a text string including the advertiser's name (e.g., shipper/merchant 120).

Referring to FIG. 9, a third advertisement 186 is displayed on the shipping carrier's order tracking status webpage. The third advertisement 186 is an impression including both the advertiser's (e.g., third party advertiser) business logo and a banner advertisement including promotional information for the advertiser.

The advertisements 182, 184, and 186 may include a hyperlink directed to the advertiser's website or some other form of media chosen by the advertiser.

Now that embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

What is claimed is:

1. A method for transmitting directed advertising to a client machine for display in connection with shipment tracking status information, the method comprising:
   receiving, by a processor running at a server, a tracking status request from a client machine via an electronic communications network, the tracking status request specifying a tracking number for a shipping order, the shipping order being associated with a shipper and a shipping carrier;
   retrieving, by the processor running at the server, from a tracking database stored on a data storage device, tracking status information for the shipping order identified by the tracking number;
   retrieving, by the processor running at the server, from at least one database stored on a data storage device, additional data associated with the shipping order identified by the tracking number;
   selecting, by the processor running at the server, from an advertisement database stored on a data storage device, at least one advertisement based on the additional data associated with the shipping order; and
   transmitting, to the client machine, the retrieved tracking status information for the shipping order and the at least one selected advertisement for display on the client machine.

2. The method of claim 1, wherein the advertisement database is maintained by at least one of the shipping carrier, the shipper, and a third party.

3. The method of claim 1, wherein the selected at least one advertisement comprises at least one selected from the group consisting of:
   an advertisement for the shipper; and
   an advertisement for a third party advertiser.

4. The method of claim 1, wherein the at least one selected advertisement is associated with an advertiser, the method further comprising:
   charging the advertiser a fee for display of the advertisement.

5. The method of claim 1, wherein the at least one selected advertisement is associated with an advertiser, the method further comprising:
   receiving, by the processor running at the server, a signal indicating that a user has clicked on a displayed advertisement; and
   responsive to the received signal, charging the advertiser a fee.

6. The method of claim 1, wherein the at least one selected advertisement is associated with an advertiser and comprises a hyperlink pointing to at least one selected from the group consisting of:
   (a) a webpage affiliated with the advertiser and
   (b) media chosen by the advertiser for display when selected.

7. The method of claim 1, wherein the at least one selected advertisement is associated with an advertiser and comprises at least one selected from the group consisting of (a) an advertiser's business name, (b) an advertiser's logo, (c) a banner advertisement including promotional information, (d) a shipper's business name, (e) a shipper's logo, (f) a third party advertiser's business name, (g) a third party advertiser's logo, (h) a text, (i) a graphic, (j) a picture, (k) an animation, (l) an audio message, (m) a video, (n) a hyperlink, (o) a pop-up, (p) a pop-under advertisement, and (q) a flash advertisement.

8. The method of claim 1, wherein retrieving, from at least one database stored on a data storage device, additional data associated with the shipping order comprises retrieving, by the processor running at the server, data identifying at least one party associated with the shipping order.

9. The method of claim 1, wherein retrieving, from at least one database stored on a data storage device, additional data associated with the shipping order comprises retrieving, by the processor running at the server, data identifying at least one of the shipper and the shipping carrier.

10. The method of claim 1, wherein the tracking status information for the shipping order is displayed concurrently with the at least one selected advertisement.

11. The method of claim 10, wherein the tracking status information for the shipping order are displayed as components of a webpage.

12. The method of claim 1, wherein transmitting the retrieved tracking status information and the at least one selected advertisement to the client machine comprises transmitting code to the client machine, wherein the code is configured to cause the client machine to display a webpage comprising the tracking status information and the at least one selected advertisement.

13. The method of claim 1, further comprising:
   determining, by the processor running at the server, preselected criteria associated with at least one of a plurality of available advertisements;
   wherein selecting at least one advertisement comprises selecting, by the processor running at the server, at least one of the plurality of available advertisements based on the additional data associated with the shipping order and further based on the determined preselected criteria associated with the at least one advertisement.

14. The method of claim 13, wherein the preselected criteria associated with at least one of the available advertisements comprise at least one of a range of days of the week, dates, and time of day during which the advertisement is to be displayed.

15. The method of claim 13, wherein the preselected criteria associated with at least one of the available advertisements comprise at least one criterion directed toward avoiding a conflict between the subject matter of the advertisement and the shipper.

16. The method of claim 1, wherein:
   retrieving additional data associated with the shipping order comprises retrieving, by the processor running at the server, shipping information from a shipment database; and
   selecting the at least one advertisement comprises selecting, by the processor running at the server, the at least one advertisement based on the retrieved shipping information.

17. The method of claim 1, wherein:
   retrieving additional data associated with the shipping order comprises retrieving, by the processor running at the server, transaction information from a transaction database; and
   selecting the at least one advertisement comprises selecting, by the processor running at the server, the at least one advertisement based on the retrieved transaction information.

18. The method of claim 1, wherein:
   retrieving additional data associated with the shipping order comprises retrieving, by the processor running at the server, client information from a client database; and selecting the at least one advertisement comprises selecting, by the processor running at the server, the at least one advertisement based on the retrieved client information.

19. A system for transmitting directed advertising to a client machine for display in connection with shipment tracking status information, the system comprising:
   a first data storage device, configured to store a tracking database comprising tracking status information for shipping orders;
   a second data storage device, configured to store additional data associated with the shipping orders;
   a processor running at a server, communicatively coupled to the first and second data storage devices, configured to perform the steps of:
      receiving a tracking status request from a client machine via an electronic communications network, the tracking status request specifying a tracking number for a shipping order, the shipping order being associated with a shipper and a shipping carrier;
      retrieving, from the first data storage device, tracking status information for the shipping order identified by the tracking number;
      retrieving, from the second data storage device, additional data associated with the shipping order identified by the tracking number;
      selecting, from an advertisement database, at least one advertisement based on the additional data associated with the shipping order; and
      transmitting, to the client machine, the retrieved tracking status information for the shipping order and the at least one selected advertisement for display on the client machine.

20. The system of claim 19, wherein:
   the processor is further configured to determine preselected criteria for at least one of a plurality of available advertisements; and
   the processor is configured to select the at least one advertisement by selecting at least one of the plurality of available advertisements based on the additional data associated with the shipping order and further based on the determined preselected criteria associated with the at least one advertisement.

21. The system of claim 20, wherein the preselected criteria for the advertisement comprise at least one of a range of days of the week, dates, and time of day during which the advertisement is to be displayed.

22. The system of claim 20, wherein the preselected criteria associated with the at least one advertisement comprise at least one criterion directed toward avoiding a conflict between the subject matter of the selected at least one advertisement and the shipper.

23. The system of claim 19, wherein the advertisement database is maintained by at least one of the shipping carrier, the shipper, and a third party.

24. The system of claim 19, wherein the selected at least one advertisement comprises at least one selected from the group consisting of:
   an advertisement for the shipper; and
   an advertisement for a third party advertiser.

25. The system of claim 19, wherein the at least one selected advertisement is associated with an advertiser, the system further comprising:
   a billing module, communicatively coupled to the processor running at the server, configured to charge the advertiser a fee for display of the advertisement.

26. The system of claim 19, wherein the at least one selected advertisement is associated with an advertiser, and wherein:
   the processor is further configured to receive a signal indicating that a user has clicked on a displayed advertisement;
   the system further comprising a billing module, configured to, responsive to the processor receiving the signal indicating that a user has clicked on a displayed advertisement, charge the advertiser a fee.

27. The system of claim 19, wherein the at least one selected advertisement is associated with an advertiser and comprises:
   a hyperlink pointing to at least one selected from the group consisting of:
      (a) a webpage affiliated with the advertiser; and
      (b) media chosen by the advertiser for display when selected.

28. The system of claim 19, wherein the at least one selected advertisement is associated with an advertiser and comprises:
   at least one selected from the group consisting of (a) an advertiser's business name, (b) an advertiser's logo, (c) a banner advertisement including promotional information, (d) a shipper's business name, (e) a shipper's logo, (f) a third party advertiser's business name, (g) a third party advertiser's logo, (h) a text, (i) a graphic, (j) a picture, (k) an animation, (l) an audio message, (m) a video, (n) a hyperlink, (o) a pop-up, (p) a pop-under advertisement, and (q) a flash advertisement.

29. The system of claim 19, wherein the processor is configured to retrieve additional data associated with the shipping order by retrieving, from the second data storage device, data identifying at least one party associated with the shipping order.

30. The system of claim 19, wherein the processor is configured to retrieve additional data associated with the shipping order by retrieving, from the second data storage device, data identifying at least one of the shipper and the shipping carrier.

31. The system of claim 19, wherein the processor is configured to transmit the retrieved tracking status information and the at least one selected advertisement to the client machine by transmitting code to the client machine, wherein the code is configured to cause the client machine to display a webpage comprising the tracking status information and the at least one selected advertisement.

32. The system of claim 19, wherein:
   the second data storage device comprises a shipment database; and
   the processor is configured to retrieve additional data associated with the shipping order by retrieving shipping information from the shipment database; and
   the processor is configured to select the at least one advertisement by selecting the at least one advertisement based on the retrieved shipping information.

33. The system of claim 19, wherein:
   the second data storage device comprises a transaction database; and
   the processor is configured to retrieve additional data associated with the shipping order by retrieving transaction information from the transaction database; and
   the processor is configured to select the at least one advertisement by selecting the at least one advertisement based on the retrieved transaction information.

34. The system of claim 19, wherein:
the second data storage device comprises a client database; and
the processor is configured to retrieve additional data associated with the shipping order by retrieving client information from the client database; and
the processor is configured to select the at least one advertisement by selecting the at least one advertisement based on the retrieved client information.

* * * * *